(12) United States Patent
Cargnini et al.

(10) Patent No.: US 10,359,953 B2
(45) Date of Patent: Jul. 23, 2019

(54) METHOD AND APPARATUS FOR OFFLOADING DATA PROCESSING TO HYBRID STORAGE DEVICES

(71) Applicant: Western Digital Technologies, Inc., Irvine, CA (US)

(72) Inventors: Luis Vitorio Cargnini, San Jose, CA (US); Viacheslav Anatolyevich Dubeyko, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 115 days.

(21) Appl. No.: 15/382,564

(22) Filed: Dec. 16, 2016

(65) Prior Publication Data

US 2018/0173441 A1 Jun. 21, 2018

(51) Int. Cl.
*G06F 3/00* (2006.01)
*G06F 3/06* (2006.01)

(52) U.S. Cl.
CPC ............ *G06F 3/0619* (2013.01); *G06F 3/065* (2013.01); *G06F 3/0659* (2013.01); *G06F 3/0688* (2013.01)

(58) Field of Classification Search
CPC ...... G06F 3/0619; G06F 3/065; G06F 3/0688; G06F 3/0659
See application file for complete search history.

(56) References Cited

U.S. PATENT DOCUMENTS

| | | | |
|---|---|---|---|
| 7,650,331 B1 * | 1/2010 | Dean | G06F 9/5066 712/203 |
| 8,549,518 B1 * | 10/2013 | Aron | G06F 9/45558 718/1 |
| 8,819,335 B1 * | 8/2014 | Salessi | G06F 12/0246 711/103 |
| 8,868,869 B2 | 10/2014 | Jones et al. | |
| 9,141,292 B2 | 9/2015 | Aswadhati et al. | |

(Continued)

FOREIGN PATENT DOCUMENTS

CN 105390501 A 3/2016

OTHER PUBLICATIONS

Ouyang et al, "Active SSD Design for Energy-efficiency Improvement of Web-scale Data Analysis", Symposium on Low Power Electronics and Design, 978-1-4799-1235-3/13, 2013, https://www.google.co.in/url?sa=t&rct=j&q=&esrc=s&source=web&cd=1&cad=rja&uact=8&ved=0ahUKEwiKyKfgqMjNAhWMrY8KHRnsDqUQFggbMAA&url=http%3A%2F%2F162.105.205.34%2Ffile%2F2014318064206.pdf&usg=AFQjCNGUP0uwbohFrvpOhiA_ScJiQk44eg&bvm=bv.125596728,d.c2l; 6 pgs.

(Continued)

*Primary Examiner* — Francisco A Grullon
(74) *Attorney, Agent, or Firm* — Loza & Loza, LLP; Gabriel Fitch

(57) ABSTRACT

Systems and methods for offloading data transformation from a host to a hybrid solid state drive (HSSD) are described. In one such method, the HSSD receives initial data from the host and stores the data at a first non-volatile memory (NVM). The HSSD receives a transformation command from the host to offload data transformation. The HSSD copies the data from the first NVM to a second NVM that is configured to provide a finer granularity of data access than that of the first NVM. Then the HSSD transforms the data at the second NVM utilizing the configured processing circuit. The HSSD may store the result in the first NVM and/or second NVM, and send it to the host.

32 Claims, 10 Drawing Sheets

(56) References Cited

U.S. PATENT DOCUMENTS

| | | | |
|---|---|---|---|
| 9,263,102 B2* | 2/2016 | Flynn | G11C 7/1012 |
| 9,489,148 B2* | 11/2016 | Goss | G06F 3/067 |
| 9,552,288 B2* | 1/2017 | Goss | G06F 12/0246 |
| 2009/0203430 A1* | 8/2009 | Peek | G07F 17/32 463/25 |
| 2012/0079175 A1* | 3/2012 | Flynn | G11C 7/1012 711/103 |
| 2012/0297145 A1* | 11/2012 | Castillo | G06F 12/0868 711/138 |
| 2013/0263142 A1* | 10/2013 | Miyamae | G06F 9/5033 718/102 |
| 2013/0339786 A1* | 12/2013 | Samanta | G06F 11/1666 714/6.23 |
| 2014/0081918 A1* | 3/2014 | Srivas | G06F 17/3007 707/639 |
| 2014/0136761 A1* | 5/2014 | Li | G06F 12/0246 711/103 |
| 2014/0136764 A1* | 5/2014 | Li | G11C 16/08 711/103 |
| 2014/0281280 A1* | 9/2014 | Goss | G06F 3/067 711/148 |
| 2015/0067243 A1* | 3/2015 | Salessi | G06F 12/0246 711/103 |
| 2015/0149695 A1 | 5/2015 | Khan et al. | |

OTHER PUBLICATIONS

De et al, "Minerva: Accelerating Data Analysis in Next-Generation SSDs", http://cseweb.ucsd.edu/~swanson/papers/FCCM2013Minerva.pdf; 8 pgs.

Bae et al, "Intelligent SSD: A turbo for big data mining", Computer Science and Information Systems 0(0):1-6, http://www.doiserbia.nb.rs/img/doi/1820-0214/2016%20OnLine-First/1820-02141600008D.pdf; 19 pgs.

Kang et al, "Enabling Cost-effective Data Processing with Smart SSD", https://www.computer.org/csdl/proceedings/msst/2013/0217/00/06558444.pdf; 12 pgs.

Quero et al, "Self-sorting SSD: Producing sorted data inside active SSDs" Symposium on Mass Storage Systems and Technologies (MSST), May 30, 2015, ISSN 2160-195X, DOI: 10.1109/MSSST.2015.7208281, http://ieeexplore.ieee.org/xpl/articleDetails.jsp?reload=true&arnumber=7208281; 2 pgs.

* cited by examiner

METHOD AND APPARATUS FOR OFFLOADING DATA PROCESSING TO HYBRID STORAGE DEVICES

FIELD

Aspects of the disclosure relate generally to solid state storage devices, and more specifically, to hybrid solid state storage devices utilizing different types of data storage.

BACKGROUND

In a variety of consumer electronics and computers, solid state drives incorporating non-volatile memories (NVMs) are frequently replacing or supplementing conventional rotating hard disk drives for mass storage. These non-volatile memories may include one or more flash memory devices, the flash memory devices may be logically divided into blocks, and each of the blocks may be further logically divided into addressable pages. In some applications, a host may read data from a solid state drive (SSD), perform a transformation on the data, and write the transformed data back to the SSD. However, the input and output stack or interface between the host and the SSD may present a bottleneck, limiting how fast the host may transform data stored at the SSD.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure provide a method and a data storage apparatus that offload data transformation from a host. Offloading data transformation from the host can avoid or mitigate the data interface bottleneck between the host and the data storage apparatus. In general, it shifts the current data transformation processing paradigm from CPU centric to memory-centric.

In one aspect of the disclosure, this disclosure relates to a method for operating a hybrid solid state drive (HSSD) including a first non-volatile memory (NVM), a second NVM, and a processing circuit. The HSSD receives data from a host and stores the data (initial data) at the first NVM. To offload data transformation operation to the HSSD, the host may send a transformation command to the HSSD. In response to the received transformation command, the HSSD may store a copy of the data at a second NVM that is configured to provide a finer granularity of data access than that of the first NVM. Then the HSSD may transform the data stored at the second NVM utilizing its processing circuit based on the transformation command. After transformation, the HSSD may store transformed data in the first NVM and/or second NVM. Optionally, the HSSD may send the transformed data or result to the host, if requested.

In another aspect of the disclosure, this disclosure relates to a hybrid solid state drive (HSSD) configured to offload data transformation operation from a host. The HSSD includes a first NVM and a second NVM that is configured to provide a finer granularity of data access than that of the first NVM. The HSSD further includes a processing circuit operatively coupled to the first NVM and the second NVM. The processing circuit is configured to receive data from a host and store the data (initial data) at the first NVM. In response to a transformation command received from the host, the processing circuit is configured to store a copy of the data at the second NVM. Then, the processing circuit is further configured to transform the data stored at the second NVM based on the transformation command. The processing circuit may store transformed data in the first NVM and/or second NVM. Optionally, the processing circuit may send the transformed data or result to the host if requested.

In another aspect of the disclosure, this disclosure relates to a hybrid solid state drive (HSSD). The HSSD includes a first non-volatile memory (NVM) and a second NVM that is configured to provide a finer granularity of data access than that of the first NVM. The HSSD further includes means for receiving data from a host and storing the data at the first NVM, means for receiving a transformation command from the host, means for storing a copy of the data at the second NVM; and means for transforming, based on the transformation command, the data stored at the second NVM. The HSSD may further include means for storing transformed data in the first NVM and/or second NVM, and optionally sending the transformed data to the host if requested.

DETAILED DESCRIPTION

Figure 1:
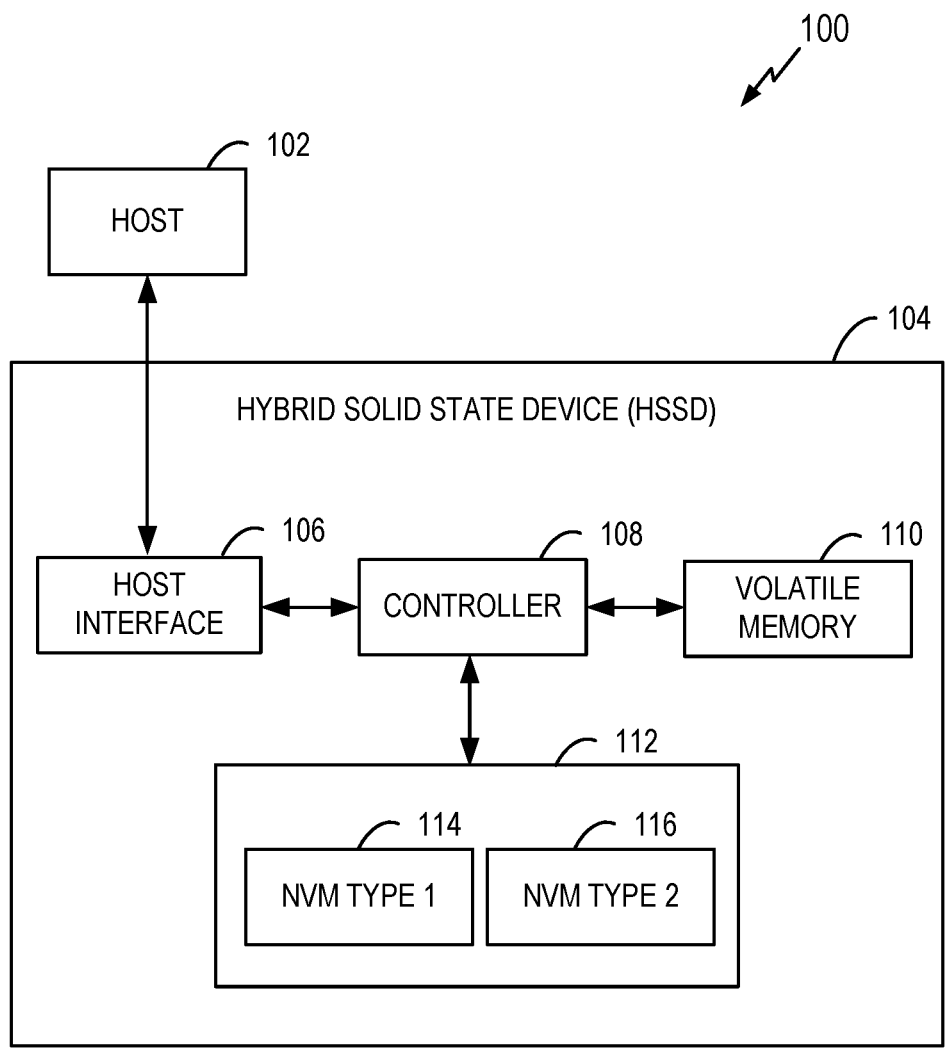
FIG. 1 is a diagram of a hybrid solid state device (HSSD) that is configured to offload data processing from a host in accordance with one embodiment of the disclosure.

Referring now to the drawings, systems and methods for offloading data processing from a host to a hybrid solid state device (HSSD) are illustrated. In some embodiments, the HSSD receives data from a host and stores the data at a first non-volatile memory (NVM). In such case, the HSSD may receive a transformation command from the host and transforms, based on the command, the data utilizing a processing circuit and a second NVM that provides a finer granularity of data access than that of the first NVM. The command may cause the HSSD to copy the data from the first NVM to the second NVM, and perform one or more data transformation operations on the data at the second NVM. After transformation, the HSSD can store the transformed data in the first NVM and/or second NVM. The HSSD may send the transformed data to the host if requested. Therefore, data transformation operation can be offloaded from the host.

FIG. 1 is a block diagram of an HSSD that can perform various functions to offload data processing from a host in accordance with some embodiments of the disclosure. The system 100 includes a host 102 and an HSSD 104 coupled to the host 102. The host 102 provides various commands to the HSSD 104 for transferring data between the host 102 and the HSSD 104. For example, the host 102 may provide a write command to the HSSD 104 for writing data to the HSSD 104 or read command to the HSSD 104 for reading data from the HSSD 104. The host 102 may be any system or device having a need for data storage or retrieval and a compatible interface for communicating with the HSSD 104. For example, the host 102 may a computing device, a personal computer, a portable computer, or workstation, a server, a personal digital assistant, a digital camera, a digital phone, or the like.

The HSSD 104 includes a host interface 106, a controller 108, a volatile memory 110, and a persistent storage 112. The persistent storage 112 may include two or more types of non-volatile memory (NVM), for example, type 1 NVM 114 and type 2 NVM 116. These NVMs may be different in the way they can be accessed and utilized (i.e., read access and/or write access) by the controller 108. Examples of these NVMs and their applications will be described in more detail below. The host interface 106 is coupled to the controller 108 and facilitates communication between the host 102 and the controller 108. Additionally, the controller 108 is coupled to the volatile memory 110 and the persistent storage 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, a Peripheral Component Interconnect Express (PCIe) interface, a Non-Volatile Memory Express (NVMe) interface, or the like. In some embodiments, the host 102 includes the HSSD 104. In other embodiments, the HSSD 104 is remote with respect to the host 102 or is contained in a remote computing system coupled in communication with the host 102. For example, the host 102 may communicate with the HSSD 104 through a wired and/or wireless communication link.

The controller 108 controls operation of the HSSD 104. In various embodiments, the controller 108 receives commands from the host 102 through the host interface 106 and performs the commands to transfer data between the host 102 and the persistent storage 112. The controller 108 may include any type of processing device, such as a microprocessor, a microcontroller, an embedded controller, a logic circuit, software, firmware, or the like, for controlling operation of the HSSD 104.

In some embodiments, some or all of the functions described herein as being performed by the controller 108 may instead be performed by another element of the HSSD 104. For example, the HSSD 104 may include a microprocessor, a microcontroller, an embedded controller, a logic circuit, a field-programmable gate array (FPGA), an application-specific integrated circuit (ASIC), software, firmware, or any kind of processing device, for performing one or more of the functions described herein as being performed by the controller 108. In some embodiments, one or more of the functions described herein as being performed by the controller 108 are instead performed by the host 102. In some embodiments, some or all of the functions described herein as being performed by the controller 108 may instead be performed by another element such as a controller in a hybrid drive including both non-volatile memory elements and magnetic storage elements.

The volatile memory 110 may be any memory, computing device, or system capable of storing data. The volatile memory 110 can maintain its data while the device is powered. For example, the volatile memory 110 may be a random-access memory (RAM) such as a dynamic random-access memory (DRAM), a static random-access memory (SRAM), a synchronous dynamic random-access memory (SDRAM), or the like. In various embodiments, the controller 108 uses the memory 110, or a portion thereof, to store data during the transfer of data between the host 102 and the persistent storage 112. For example, the volatile memory 110 or a portion of the memory 110 may be a cache memory that may be used to store recently accessed data to improve access speed.

The controller 108 can control writing data to and reading data from the persistent storage 112. The persistent storage 112 may include one or more types of non-volatile data storages, such as a flash storage system, a solid state drive, a flash memory card, a secure digital (SD) card, a universal serial bus (USB) memory device, a CompactFlash card, a SmartMedia device, a flash storage array, a flash storage, an erasable programmable read-only-memory (EPROM), an electrically erasable programmable read-only-memory (EEPROM), magnetoresistive random-access memory, non-volatile RAM, ferroelectric RAM, or phase-change RAM, or the like.

In some applications, the host 102 reads data from the HSSD 104, transforms the data, and writes the transformed data back to the HSSD 104. In this case, however, the interface between the host 102 and the HSSD 104 often becomes a bottleneck because the host 102 needs to read data from the HSSD 104 and write the transformed data back to the HSSD 104. This bottleneck may be mitigated or avoided by offloading the data transforming process to the HSSD 104.

Figure 2:
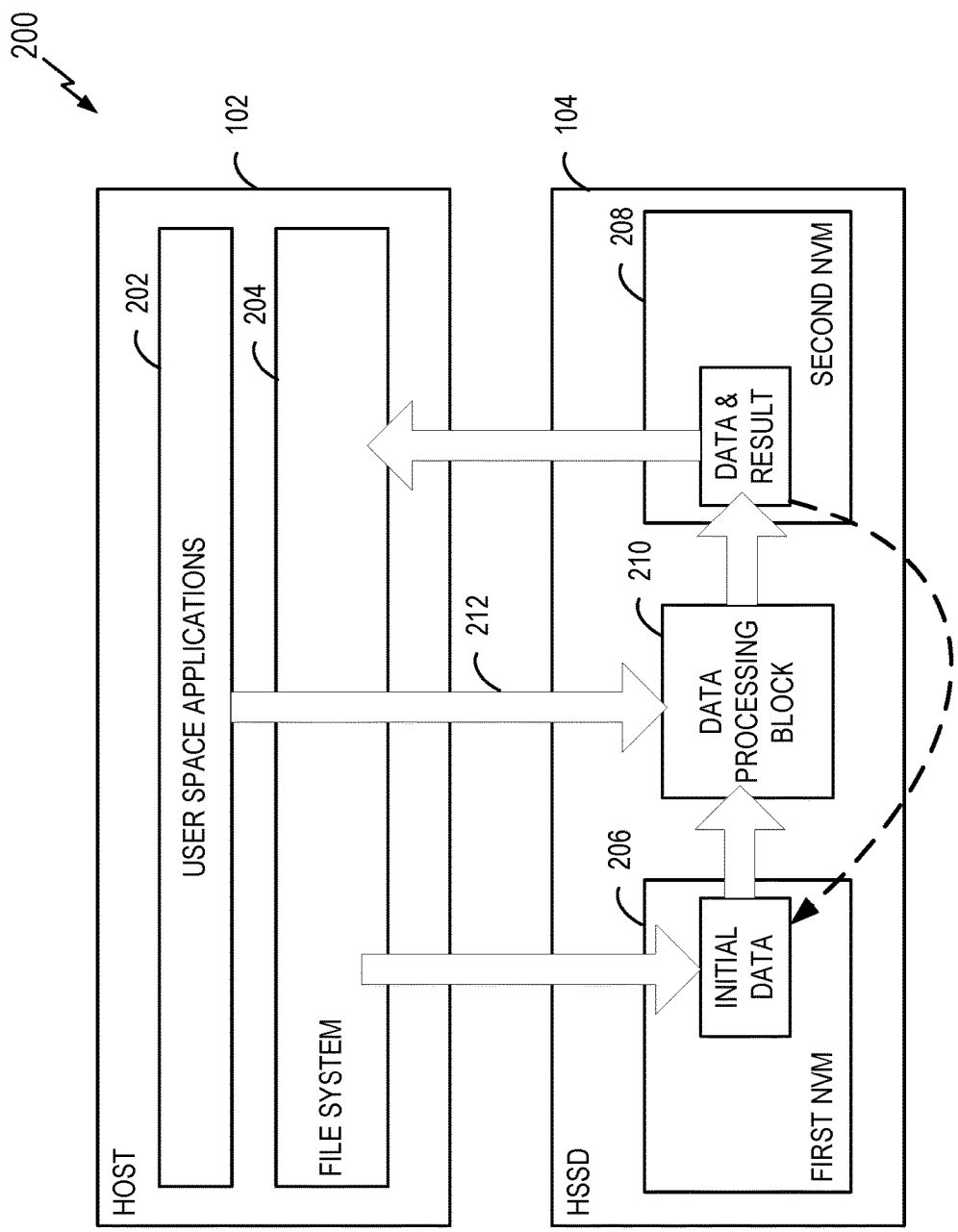
FIG. 2 is a diagram illustrating a process for offloading data processing to the HSSD in accordance with one embodiment of the disclosure.

FIG. 2 is a block diagram illustrating a process 200 for offloading a data transformation process to the HSSD 104 in accordance with one embodiment of the disclosure. In this embodiment, the host 102 may offload various data transformation functions to the HSSD 104. The host 102 may execute various user space applications 202 that utilize or manipulate data stored in a preselected file system 204. The file system may be used to control how data is stored at and retrieved from the HSSD 104. The file system may identify the various data stored at the HSSD 104 as files or filenames. The file system may maintain metadata for the files, and the metadata associated with each file may include various information that describes the data. For example, the metadata may include the length of the data contained in the file, time that the file was created and last modified, access permission, file attributes, location of the file on the HSSD 104, etc. In some examples, metadata may also include unused storage locations on the HSSD 104. When the host needs to transform certain data or files stored by the file system 204, the host 102 may offload the transformation process of the data to the HSSD 104 and have the data transformed by the HSSD 104 without the need to transfer the initial data to the host.

Some examples of data transformations are MapReduce, database requests, and machine learning operations. A MapReduce program may include a map procedure and a reduce procedure. The Map procedure (Map ( )) may perform certain filtering and sorting functions (e.g., sorting students records by first name into queues, one queue for each name). The reduce procedure (Reduce ( )) may perform a summary operation (e.g., counting the number of students in each queue, yielding name frequencies). Any data processing model that can fit into the MapReduce model may be offloaded to the HSSD 104.

Some database request processes can be offloaded to the HSSD 104. For example, the host 102 needs to apply a data query (e.g., SELECT SQL query) on some table(s) of a database stored at the HSSD 104. The host 102 can send to the HSSD side the condition of such query (e.g., SELECT first_name, last_name, age FROM employee WHERE first_name='Eric'). Then the query can be processed at the HSSD 104, and the results can be returned to the host 102.

In another example, some machine learning or data analytics algorithms can be offloaded to the HSSD 104. For example, an initial set of data can be stored into a first type of NVM 206. Then, the HSSD 104 can process the initial set of data internally or locally by means of a data processing block 210 and a second type of NVM 208.

In one example, the HSSD 104 can include two or more different types of non-volatile memories (NVMs), for example, first NVM 206 and second NVM 208. The first NVM 206 may be the same as the type 1 NVM 114, and the second NVM 208 may be the same as the type 2 NVM 116 of FIG. 1. In one example, the memory or data storage locations of the first NVM 206 are arranged as a number of blocks, and each block may include a number of pages. A page may be the smallest memory unit of the first NVM 206. The second NVM 208 may have its memory arranged in a different fashion, for example, similar to that of a DRAM. In general, the second NVM 208 is configured to provide finer granularity of data access (e.g., erasing, writing, and/or reading) than that of the first NVM 206. In one example, the minimum unit of data that can be written (or programmed) to the first NVM 206 is larger than that of the second NVM 208. In another example, the minimum unit of data that can be read (or retrieved) from the first NVM 206 is larger than that of the second NVM 208. In another example, the minimum unit of data storage of the first NVM 206 that can be erased (or reset) is larger than that of the second NVM 208. A unit of data or data storage may be bit, nibble, byte, word, page, block, or the like. In one example, the first NVM 206 is page-addressable, and the second NVM 208 is byte-addressable. Page-addressable means that the smallest unit of data that can be addressed is a page. Byte-addressable means that the smallest unit of data that can be addressed is a byte.

In one example, the first NVM 206 may be a negative-AND (NAND) flash memory or the like. The minimum unit of data that can be written to NAND flash memory is a page (e.g., one page contains multiple bytes of data). If a page has already been written with data, it needs to be erased or reset before new data can be written or programmed to the same page. Typically, NAND flash memory is erasable at block level but not below the block level. In this disclosure, a memory device is called block erasable when a whole block must be erased in order to erase a single page contained in that block. A block may include multiple bits, bytes, words, or pages of data.

In one example, the second NVM 208 may be accessed (read and/or write) using a data unit smaller than that of the first NVM 206. That is the second NVM 208 has a finer granularity of data access than the first NVM 206. Some examples of the second NVM 208 are magnetoresistive random-access memory, non-volatile RAM, ferroelectric RAM, resistive random-access memory (ReRAM), and/or phase-change RAM. To offload data transformation, the host 102 writes initial data to the HSSD 104 that stores the initial data into the first NVM 206. Then the HSSD can copy the initial data to the second NVM 208 (e.g., byte-addressable NVM) and perform the data transformation of the initial data at the second NVM 208.

In several embodiments, the first NVM 206 (e.g., NAND flash) may generally have higher latency and/or be cheaper than the second NVM 208. So while the first NVM 206 can provide the needed capacity to store initial data at a reduced cost, the second NVM 208 can provide lower latency and finer random access granularity (not available from the first NVM 206) to deliver faster resulting data and facilitate faster data processing at the HSSD. That is, the HSSD can copy the data from the first NVM to the second NVM 208 and process the data at the second NVM. Therefore, the HSSD 104 can combine the benefits of both types of non-volatile memory to facilitate offloading data transformation from the host 102.

The second NVM 208 can mitigate certain shortcomings of using only the first NVM to offload data transformation from the host. For example, the first NVM 206 (e.g., NAND flash) may have a relatively complicated or restricted read/write procedure and/or high bit error rate (BER) compared to the second NVM 208. Therefore, it is undesirable to directly transform data at the first NVM 206. Moreover, since the second NVM 208 provides a persistent storage, it can reduce the chance of data loss if the transformation process is interrupted, for example, due to unexpected power disruption to the HSSD.

The HSSD 104 can use a data processing block 210 to transform the initial data according to a command 212 received from the host 102, for example, data transformation commands provided by the user space applications 202 at the host. Some examples of user space applications are database system manager and MapReduce applications. The data processing block 210 can be configured to perform any of the host data processing offloading operations described herein. In some embodiments, the data processing block 210 may include a processor, an FPGA, an ASIC, or any kind of processing device. In one example, the data processing block 210 may include an FPGA that has been programmed to perform various data transformation functions that can be offloaded from the host 102. The host 102 may be equipped with suitable software and/or firmware to program the FPGA, for example using a hardware description language (HDL), before the FPGA (the data processing block 210) can be utilized by the user space applications 202 to offload data transformation functions. The command 212 from the user space applications 202 may include one or more commands to start, stop, or control a certain data transformation function that can be performed by the data processing block 210. The command 212 also may identify the data (e.g., file identification) to be transformed.

Figure 3:
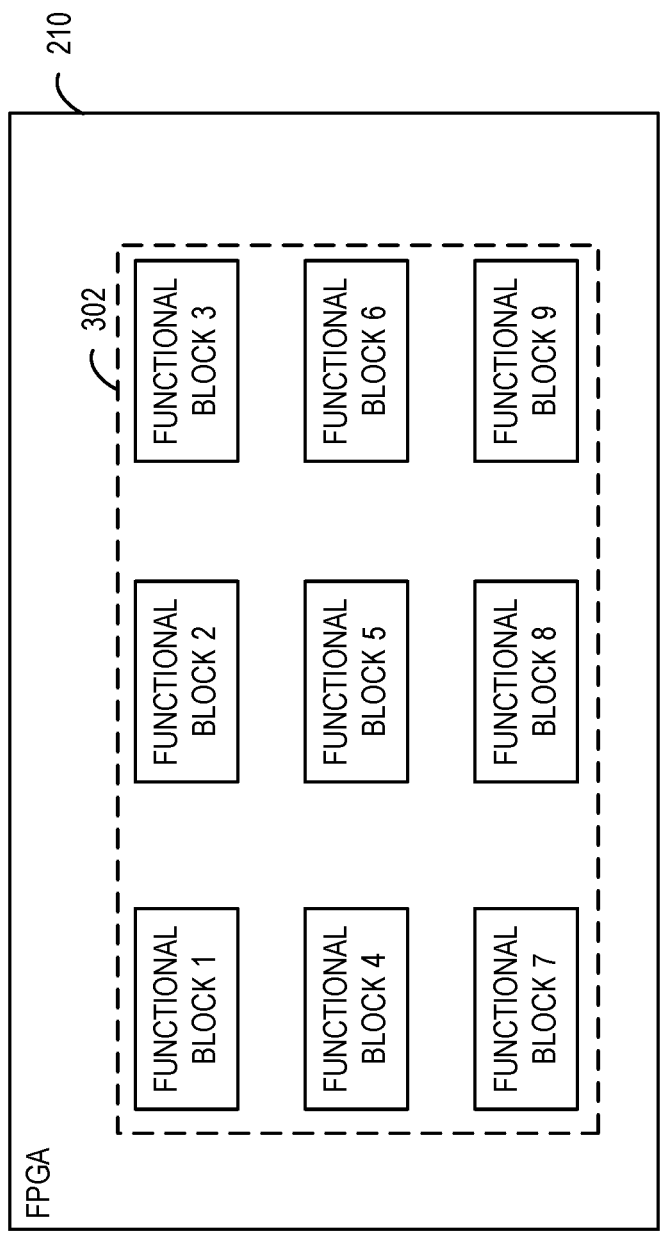
FIG. 3 is a diagram of a data processing block of the HSSD that includes multiple configurable functional blocks in accordance with one embodiment of the disclosure.

Referring to FIG. 3, the data processing block 210 may include multiple functional blocks (e.g., nine FPGA 302 blocks are shown in FIG. 3) that may be utilized by the HSSD to perform various data transformation functions simultaneously and/or in sequence. Before the user space applications 202 can utilize the FPGA blocks 302 to offload data transformation, the FPGA blocks 302 are programmed by the host 102 or other programming devices (e.g., a separate programming computer in data communication with the data processing block 210) using, for example, FPGA programming code. In some examples, multiple functional blocks 302 may be configured or programmed to perform the same data transformation function. In some examples, different functional blocks 302 may be configured to perform different data transformation functions. For example, the user-space applications 202 can send one or more commands to the data processing block 210 to utilize certain preprogrammed functional block(s) 302 to apply a preconfigured data transformation function for transforming a file or data initially stored at the first NVM 206. In response to the command 212, the data processing block 210 locates the file and utilizes one or several configured functional blocks 302 (FPGA blocks) to process the file with one or more data transformation functions that have been programmed into the functional blocks.

The first NVM 206 may be used to store the initial data when it is received from the host 102, and the second NVM 208 may be used to perform data transformation on the data. To transform data, the data processing block 210 or a controller may copy the initial data from the first NVM (e.g., page-addressable NVM) to the second NVM (e.g., byte-addressable NVM). The data processing block 210 may also store intermediate data and result of the transformation at the second NVM. During transformation, the data processing block may move or copy data from one location in the second NVM to another location. After transformation, the data processing block 210 may store the results in the first NVM and/or second NVM, and may send them to the host if requested. In some examples, the results stored in the first NVM can be the initial data for another data transformation operation. In general, intermediate data is stored in the second NVM during data transformation. In one example, however, intermediate data may be stored in the first NVM during transformation if the processing dataset will be larger than second NVM capacity. In one example, referring to FIG. 4, the data processing block 210 may be configured to process the initial data using a MapReduce model that is known in the art. The MapReduce model may use a Map call procedure (e.g., Map( )) to perform, for example, filtering and sorting of the initial data to generate some temporary keys or values. Then, the MapReduce model uses one or more Reduce call procedures (e.g., Reduce ( )) to perform a summary operation to generate the final result. In some examples, the MapReduce model can process data by using multiple threads. That is, the Map call procedure and Reduce call procedure can be performed in many threads, and some or all of the threads may be performed simultaneously or in parallel. For example, each of the functional blocks 302 may be used to perform one or more threads. The MapReduce model can be used to solve parallelizable problems across large datasets using a large number of threads, computers, or nodes simultaneously.

MapReduce processing can be used to process data stored either using a filesystem (unstructured) or a database (structured). In this example, the MapReduce can take advantage of the locality of data. That is, because the initial data is stored locally at the first NVM 206, the data processing block 210 can transform the data near the place where it is stored without the need to transfer the data to the host 102 or other processing devices via the host interface 106.

In one specific example, the MapReduce model may be executed in the following order. (1) Map function: the data processing block 210 applies the map function to the locally stored data (e.g., initial data at the first NVM 206), and writes the output to a temporary storage (e.g., second NVM 208). The data processing block 210 ensures that only one copy of redundant input data is processed. (2) Shuffle function: the data processing block 210 redistributes data based on the output keys (produced by the map function), such that all data belonging to the same key are grouped together. (3) Reduce function: the data processing block 210 processes each group of output data, per key, in parallel, to generate the final result.

Figure 5:
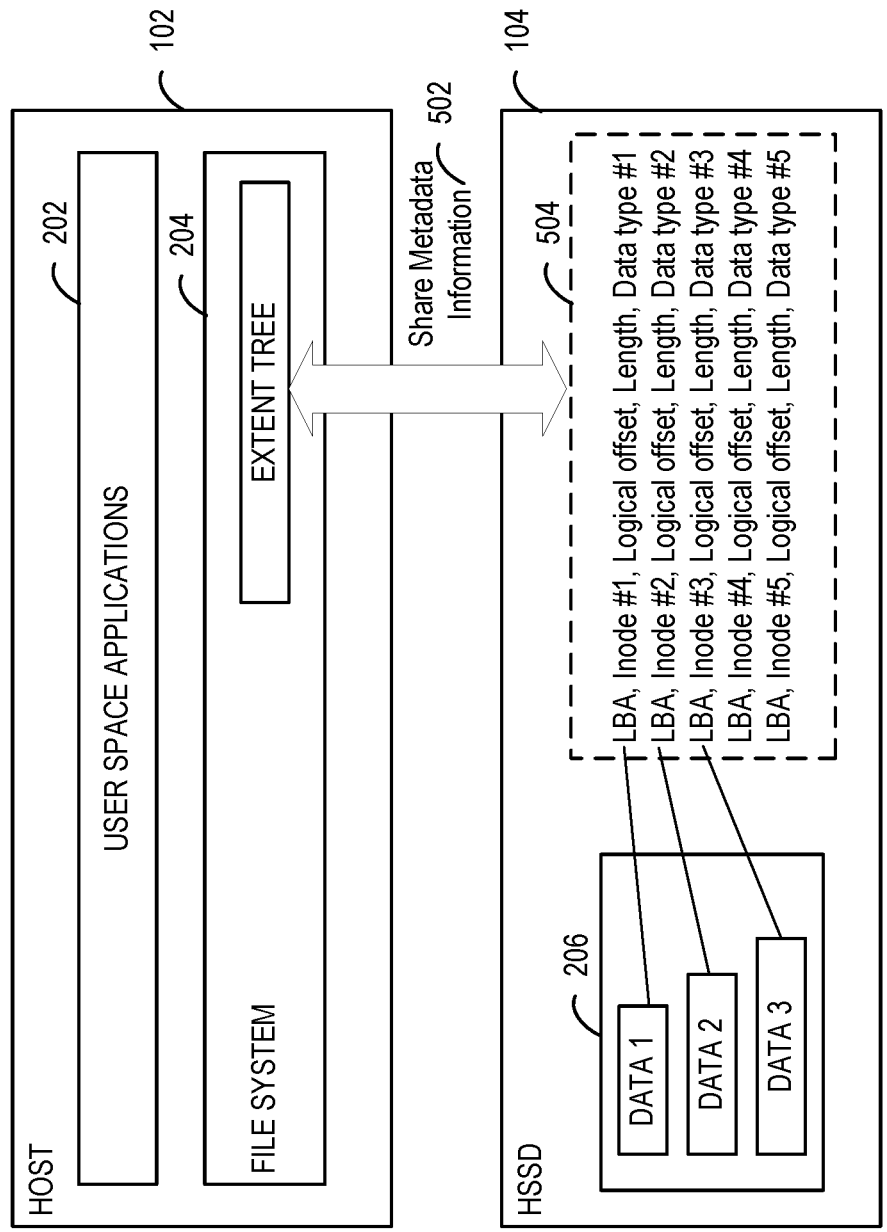
FIG. 5 is a diagram illustrating the host sharing file system metadata with the HSSD in accordance with one embodiment of the disclosure.

In some embodiments, the HSSD 104 (e.g., data processing block 210) may be informed about how the file system 204 stores its data at the first NVM 206 to facilitate the above-described processes for offloading data transformation from the host. A data file can be represented as a sequence of byte stream chunks. The file system 204 may store information about these chunks in the form of a block table or extent tree. Referring to FIG. 5, this information may be included in the metadata shared between the host 102 and HSSD 104. For example, every such chunk can be described in terms of logical block addressing (LBA), Mode ID, logical start offset, length, data type, etc.

The host 102 and the HSSD 104 may share metadata 502 of extents in various ways. In a first example, every write request from the host may contain LBA, Mode ID, logical offset, length and data type of the extent. In a second example, the metadata area at the HSSD (e.g., first NVM 206) may be represented by a special stream chunk (with special ID) that can be used for storing records that contain metadata information (e.g., LBA, Mode ID, logical offset, length, data type, etc.). LBA may be used to locate the records associated with the extents. In a third example, the file system may use a special flag in a write request that informs the HSSD about the extent tree's metadata. The HSSD can parse this metadata during a write operation and to store extent tree details 504 locally in a predetermined format or a format used by the file system.

In one embodiment, the host 102 and/or HSSD 104 may register the association between data types and data processing methods that may be performed by the data processing block 210 to transform the data types. Each byte stream chunk can be treated as a sequence of items of a certain data type. A sequence of items may be processed by a method that is associated or dedicated to the transformation of the associated data type.

Figure 6:
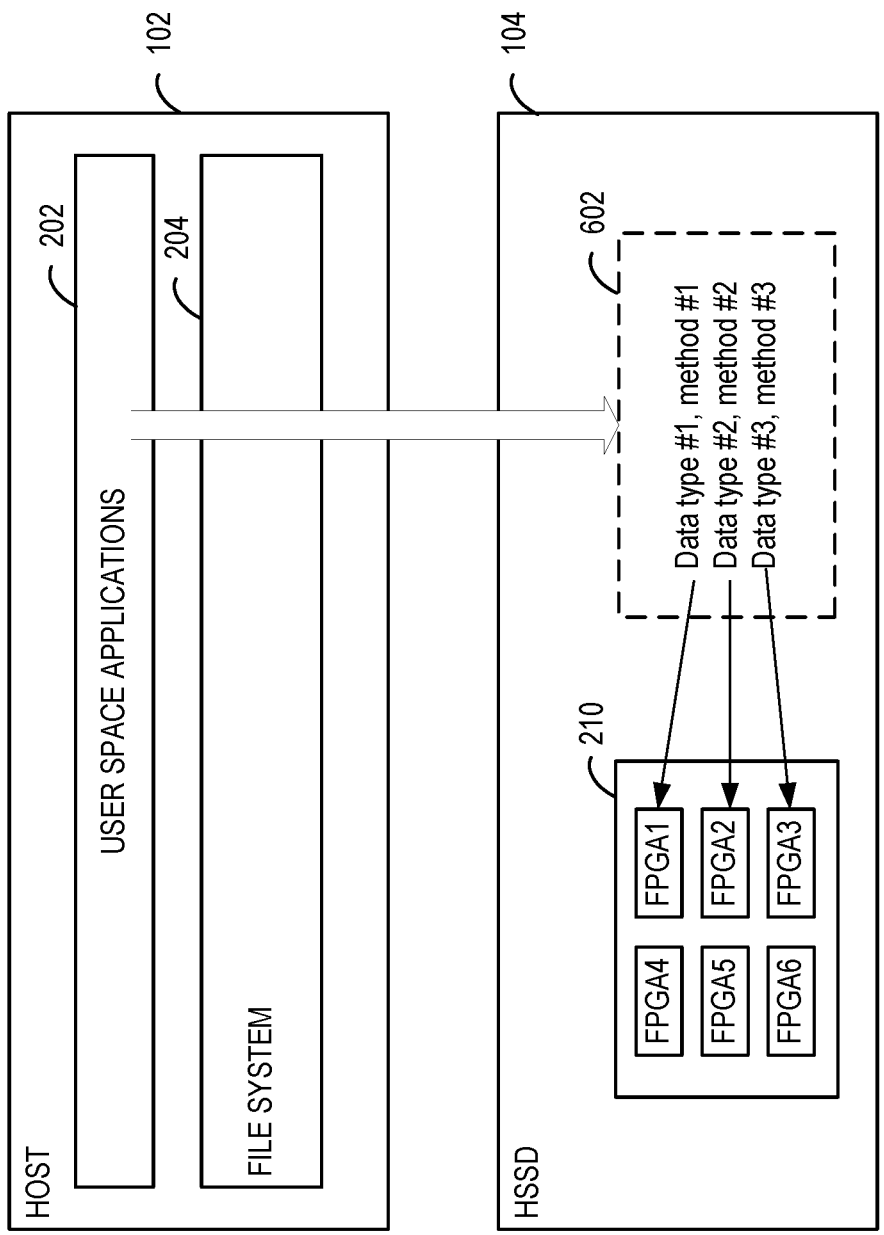
FIG. 6 is a diagram illustrating an example of a special table used to register the association between data types and data transformation methods in accordance with one embodiment of the disclosure.

Referring to FIG. 6, in one example, the HSSD 104 may maintain a special table or data structure 602 that registers the association between data types and transformation methods. In one embodiment, the table 602 may be implemented as a content-addressable-memory (CAM). The association between the data types and transformation methods may be provided by the host 102 (e.g., user space applications). In the example of FIG. 6, a first data type (data type #1) may be transformed using a first associated processing method implemented on a first FPGA functional block (e.g., FPGA1), a second data type (data type #2) may be transformed using a second associated processing method implemented on a second FPGA functional block (e.g., FPGA2), and a third data type may be transformed using a third associated processing method implemented on a third FPGA functional block (e.g., FPGA3). The association between the data types and transformation methods may be reconfigured by the host as needed. In one embodiment, the first, second and third data processing methods may be performed simultaneously and/or in sequence by the processing block 210.

In one embodiment, the FPGA functional blocks may be set in different configurations to perform different data processing methods. Before the host 102 can utilize the FPGA to perform data processing or transformation as described above, the FPGA is programmed or configured by the host 102 or a suitable computing device using special FPGA programming software known in the art. In some examples, the FPGA can be reconfigured or reprogrammed to perform different data transformation methods. During the programming of the FPGA, the data transformation methods may be associated with respective default data types. In some examples, the FPGA may be reprogrammed to change the association between the transformation methods and data types.

Figure 7:
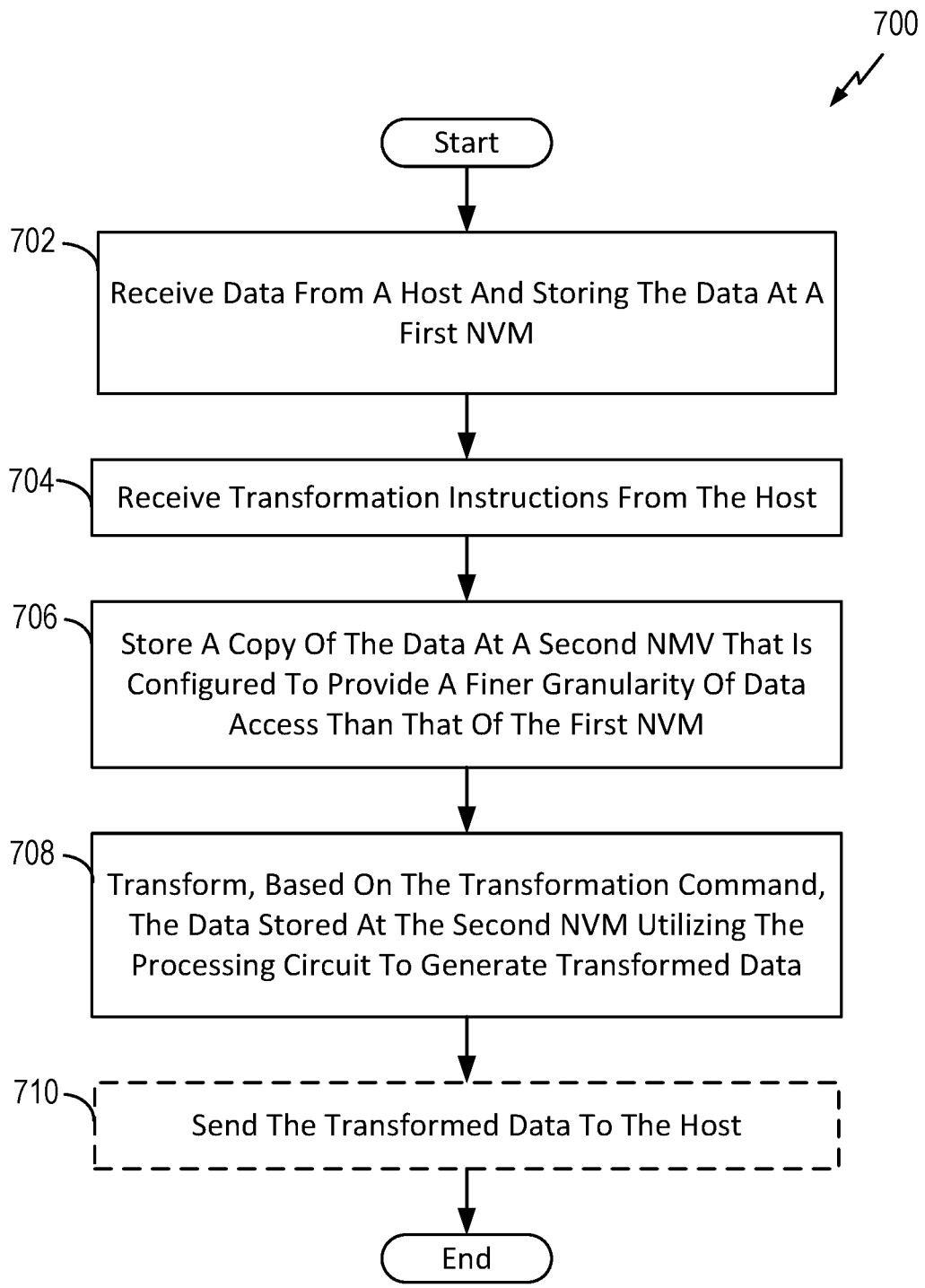
FIG. 7 is a flow chart of a process for offloading data transformation to the HSSD in accordance with one embodiment of the disclosure.

FIG. 7 is a flow chart of a process 700 for offloading data transformation from a host to the HSSD 104 in accordance with one embodiment of the disclosure. In one example, the process 700 may be used to perform the data transformation offloading processes described in FIGS. 2-6. At block 702, the HSSD 104 may receive data from the host 102 and store the data (e.g., initial data) at a first NVM (e.g., NVM 206). For example, the first NVM may be NAND flash or the like. In certain aspects, the block 702 may be effectuated with the controller 108, or with the controller 108 in combination with the host 102 as illustrated in FIG. 1. At block 704, the HSSD 104 may receive a transformation command from the host 104. For example, the HSSD 104 may utilize the host interface 106 to receive transformation command from the host. The HSSD 104 may utilize its data processing block 210 (a processing circuit) to process or transform the data in accordance with the received transformation command. In one example, the data processing block 210 may be implemented as an FPGA including a number of functional blocks 302 (see FIG. 3) that have been pre-configured using known FPGA programming methods to perform various data transformation functions. In certain aspects, the block 704 may be effectuated with the controller 108, or with the controller 108 in combination with the host 102 as illustrated in FIG. 1.

At block 706, the HSSD 104 stores a copy of the initial data at a second NVM that is configured to provide a finer granularity of data access than that of the first NVM. For example, the second NVM can be randomly accessed (read and/or write) at a page level, byte level, and/or bit level, while the first NVM can be accessed at or above the page level. The second NVM may be the same as the second NVM 208. In certain aspects, the block 706 may be effectuated with the controller 108, or with the controller 108 in combination with the host 102 as illustrated in FIG. 1. At block 708, the HSSD 104 may transform, based on the transformation command, the data stored at the second NVM utilizing the processing circuit and store transformed data in the first NVM. In one embodiment of the disclosure, the data processing block 210 (e.g., FPGA) may process the data using its internal registers (now shown) and then store the result in the second NVM. In another embodiment of the disclosure, the data processing block 210 may copy the initial data from the first NVM (e.g., NAND) to the second NVM and process the data at the second NVM. Then the data processing block 210 may store the transformed data at the same or different locations of the second NVM. In certain aspects, the block 708 may be effectuated with the controller 108, or with the controller 108 in combination with the host 102 as illustrated in FIG. 1.

At block 710, the HSSD 104 may send the transformed data back to the host 102. For example, the HSSD 104 may utilize the host interface to send the transformed data back to the host. In some embodiments of the disclosure, the HSSD 104 may or may not notify the host about the completion of the transformation, and may or may not send the transformed data back to the host 102. In certain aspects, the block 710 may be effectuated with the controller 108, or with the controller 108 in combination with the host 102 as illustrated in FIG. 1.

In one embodiment, the HSSD 104 (e.g., controller 108) decides which NVM (e.g., first NVM or second NVM) is used to store the transformed data. In another embodiment, the host 102 may decide how the transformed data is stored in the HSSD 104. For example, the host may send a first command to the HSSD to start data transformation, a second command to read the results in the second NVM 208, and a third command to move the transformed data from the second NVM to the first NVM. The host may also send a command to delete the results from the second NVM without storing this results in the first NVM. The host may be able to manage the data stored in the HSSD in a more efficient manner than the HSSD does because the host (or the user space applications 202) may have better knowledge about the current workload of data processing.

Figure 4:
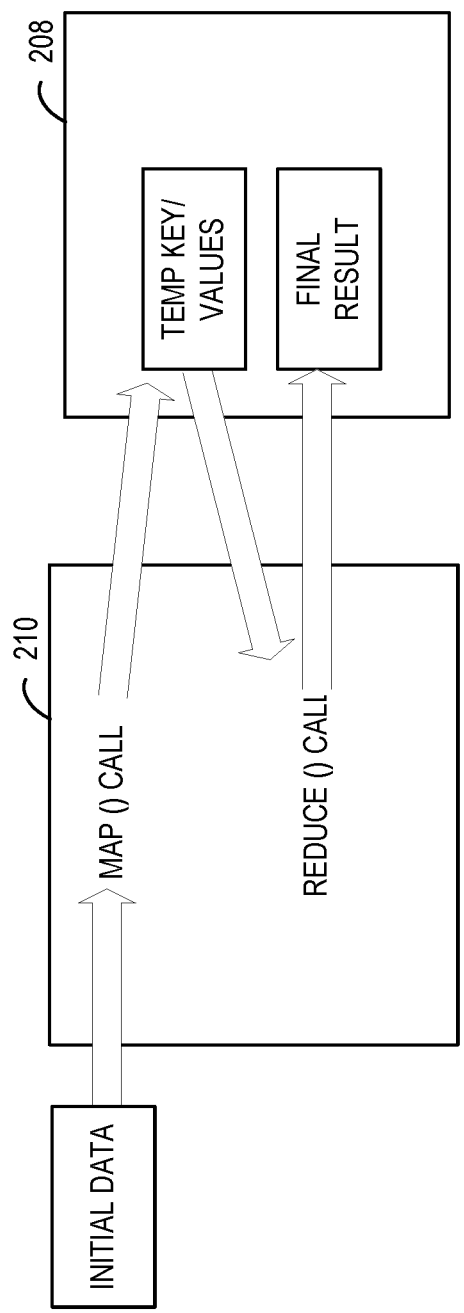
FIG. 4 is a diagram illustrating a data transformation process using a MapReduce model in accordance with one embodiment of the disclosure.
Figure 8:
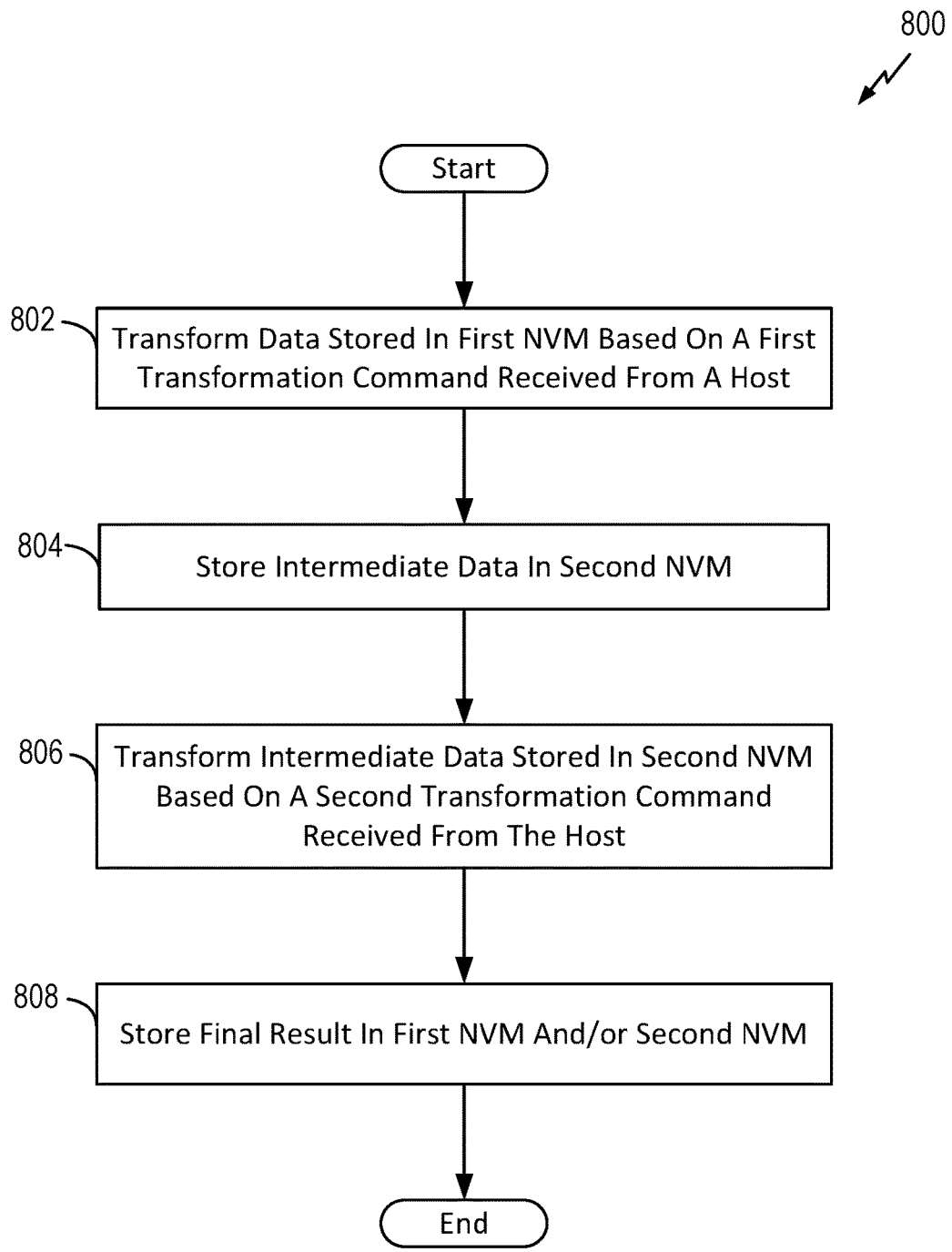
FIG. 8 is a flow chart of a process for transforming data at the HSSD in accordance with one embodiment of the disclosure.

FIG. 8 is a flow chart of a process 800 for transforming data at the HSSD 104 in accordance with one embodiment of the disclosure. This process may be included in block 706 of the process 700 for offloading data transformation from the host 102. Because the initial data has already been stored at the HSSD, the host can request the HSSD to perform data transformation without writing the data to the HSSD. In some examples, the host 102 may request the HSSD to perform multiple data transformation operations or commands on the data stored at the first NVM 206. At block 802, the HSSD 104 may transform data stored in the first NVM 206 based on a first transformation command received from the host 102. The HSSD 104 may first copy the initial data to the second NVM and transform the copied data at the second NVM. At block 804, the HSSD may store any intermediate results or data in the second NVM 208. For example, the HSSD may transform the data using a MapReduce model as illustrated in FIG. 4 and store the temporary keys and values (intermediate results) in the second NVM 208. At block 806, the HSSD may transform the intermediate results in the second NVM based on a second transformation command received from the host 102. While FIG. 8 only shows two transformation commands performed in sequence; in other examples, more than two transformation commands may be performed in sequence until the final result is obtained. At block 808, when data transformation is completed, the HSSD may store the final result (e.g., transformed data) in the first NVM 206 and/or second NVM 208. In some examples, the HSSD may send the result to the host.

Figure 9:
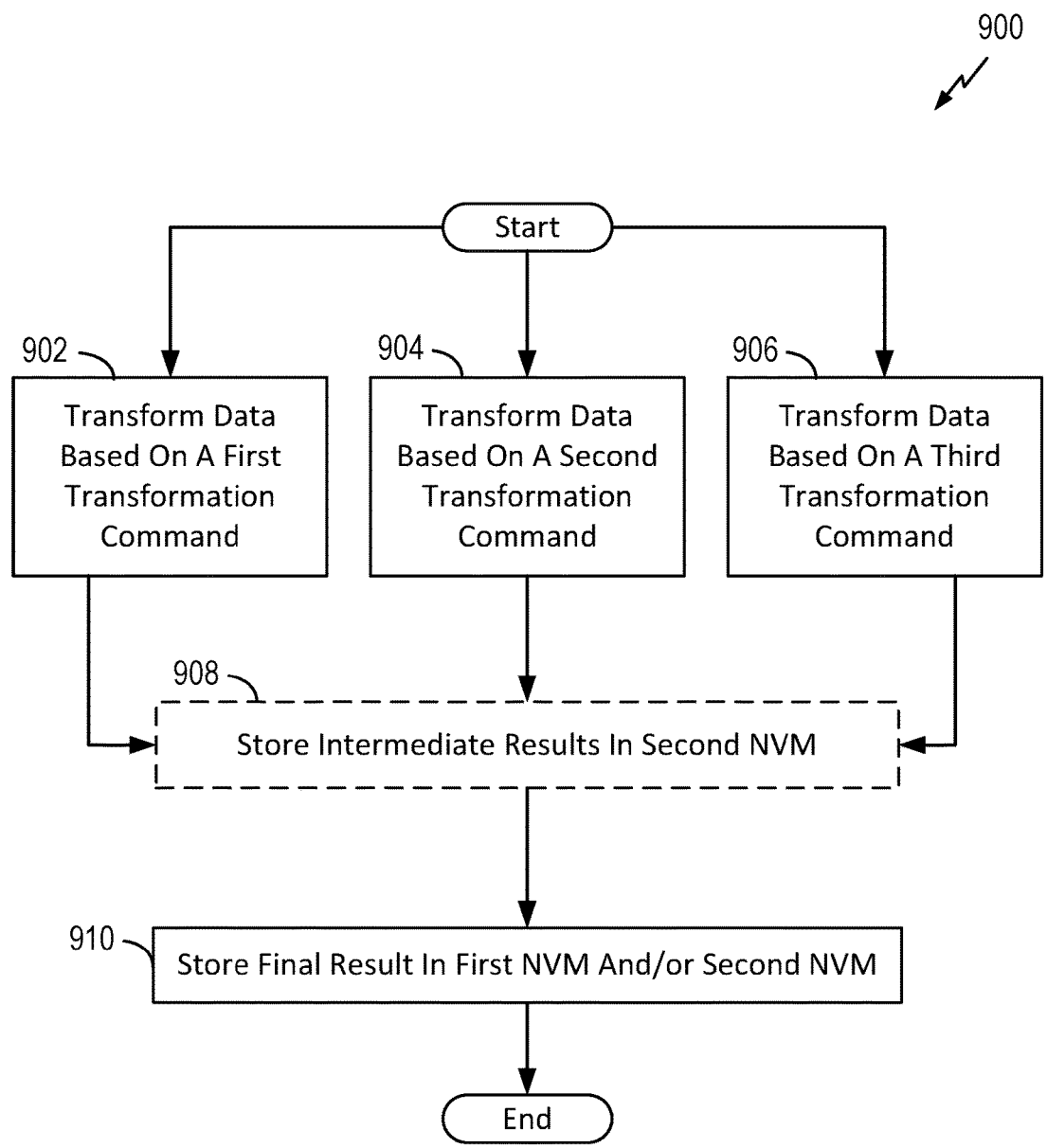
FIG. 9 is a flow chart of another process for transforming data at the HSSD in accordance with one embodiment of the disclosure.

FIG. 9 is a flow chart of a process 900 for transforming data at the HSSD 104 in accordance with one embodiment of the disclosure. This process may be included in block 706 of the process 700 for offloading data transformation from the host 102. In some examples, the host 102 may request the HSSD to perform multiple data transformation operations or commands on the data stored at the first NVM 206. Different than the process 800 described above in relation to FIG. 8, the HSSD may perform these data transformation commands in parallel. In some examples, some transformation commands may be performed concurrently, while some transformation commands may be performed in sequence.

At block 902, the HSSD may transform the data at the second NVM based on a first transformation command. At block 904, the HSSD may transform the data at the second NVM based on a second transformation command. At block 906, the HSSD may transform the data at the second NVM based on a third transformation command. The HSSD may perform these transformation commands concurrently using respective functional blocks 302 (see FIG. 3). At block 908, the HSSD may store any intermediate results at the second NVM. At block 910, the HSSD may store the result in the first NVM and/or second NVM, and may send it to the host if requested.

Figure 10:
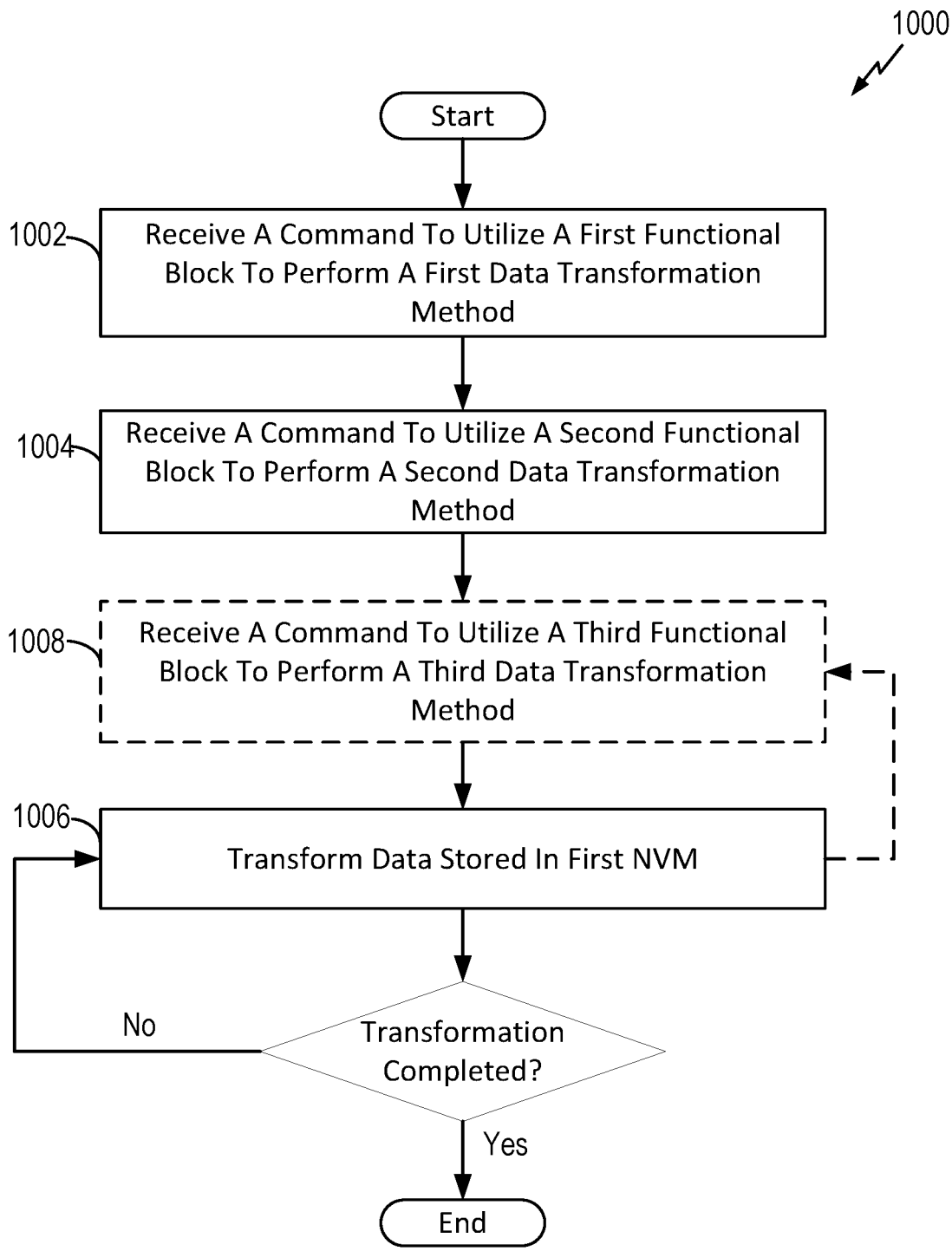
FIG. 10 is a flow chart of a process for configuring a data processing circuit of the HSSD to transform data offloaded from the host in accordance with one embodiment of the disclosure.

FIG. 10 is a flow chart of a process 1000 for utilizing the data processing block 210 to offload data transformation operations from the host 102 in accordance with one embodiment of the disclosure. This process may be included in the process 700 described above in relation to FIG. 7. In one embodiment, the data processing block 210 (e.g., FPGA) may include a plurality of configurable functional blocks 302 as illustrated in FIG. 3. The functional blocks 302 have been configured to perform various data transformation functions. At block 1002, the HSSD 104 may receive a command to utilize a first functional block to transform data using a first data transformation method. At block 1004, the HSSD 104 may receive a command to utilize a second functional block to transform data using a second data transformation method. In some examples, the HSSD 104 may utilize the first functional block and second functional block simultaneously or in sequence on the same or different data so as to increase data processing capability or throughput of the device. At block 1006, the HSSD 104 may transform the initial data stored in the first NVM 206 using the first and second data transformation methods, for example, simultaneously or in sequence. In one embodiment, at block 1008, the HSSD 104 may receive a command to utilize a third functional block to perform a third data transformation method that is different from the first and second data transformation methods. This way, the data processing circuit 210 may be used to perform different data processing methods on the data.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A method of transforming data at a hybrid solid state drive (HSSD) comprising a first non-volatile memory (NVM), a second NVM, and a processing circuit, the method comprising: receiving data from a host and storing the data at the first NVM; receiving a transformation command from the host; storing a copy of the data at the second NVM that is configured to provide a finer granularity of random data access than that of the first NVM, wherein a smallest addressable unit of the second NVM is smaller than a smallest addressable unit of the first NVM; and transforming, based on the transformation command, the data stored at the second NVM utilizing the processing circuit, using the first NVM to store initial data and the second NVM for data processing, to generate transformed data stored in at least one of the first NVM or second NVM.

2. The method of claim 1, wherein the processing circuit comprises at least one of a processor, a field-programmable gate array (FPGA), or an application-specific integrated circuit (ASIC).

3. The method of claim 1, wherein the transforming comprises:
utilizing a MapReduce model to process the data stored at the second NVM; and
storing temporary values generated by the MapReduce model at the second NVM.

4. The method of claim 1, wherein the transforming comprises:
processing the data stored at the second NVM to generate intermediate data according to the transformation command; and
storing the intermediate data at the second NVM.

5. The method of claim 1, further comprising:
receiving metadata of the data from the host, wherein the metadata comprises information on the data stored at the first NVM.

6. The method of claim 1, wherein the transforming comprises:
processing a first data type of the data using a first data processing method; and
processing a second data type of the data using a second data processing method simultaneously with the processing of the first data type.

7. The method of claim 1, wherein the transforming comprises:
performing a first data transformation on the data; and
performing a second data transformation, different from the first data transformation, on the data.

8. The method of claim 1,
wherein the first NVM comprises a NAND Flash, and
wherein the second NVM comprises at least one of magnetoresistive random-access memory, non-volatile RAM, ferroelectric RAM, phase-change RAM, or resistive random-access memory (ReRAM).

9. The method of claim 8, wherein the first NVM is page-addressable, and the second NVM is byte-addressable.

10. The method of claim 1, further comprising at least one of:
storing the transformed data in the first NVM;
storing the transformed data in the second NVM; or
sending the transformed data to the host.

11. A hybrid solid state drive (HSSD) comprising: a first non-volatile memory (NVM); a second NVM that is configured to provide a finer granularity of random data access than that of the first NVM, wherein a smallest addressable unit of the second NVM is smaller than a smallest addressable unit of the first NVM; and a processing circuit operatively coupled to the first NVM and the second NVM, wherein the processing circuit is configured to: receive data from a host and store the data at the first NVM; receive a transformation command from the host; store a copy of the data at the second NVM; and transform, based on the transformation command, the data stored at the second NVM, using the first NVM to store initial data and the second NVM for data processing, to generate transformed data stored in at least one of the first NVM or the second NVM.

12. The HSSD of claim 11, wherein the processing circuit comprises at least one of a processor, a field-programmable gate array (FPGA), or an application-specific integrated circuit (ASIC).

13. The HSSD of claim 11, wherein the processing circuit is further configured to:
   utilize a MapReduce model to process the data stored at the second NVM; and
   store temporary values generated by the MapReduce model at the second NVM.

14. The HSSD of claim 11, wherein the processing circuit is further configured to:
   process the data stored at the second NVM to generate intermediate data according to the transformation command; and
   store the intermediate data at the second NVM.

15. The HSSD of claim 11, wherein the processing circuit is further configured to receive metadata of the data from the host, and wherein the metadata comprises information on the data stored at the first NVM.

16. The HSSD of claim 11, wherein the processing circuit is further configured to transform the data by:
   processing a first data type of the data using a first data processing method; and
   processing a second data type of the data using a second data processing method simultaneously with the processing of the first data type.

17. The HSSD of claim 11, wherein the processing circuit is further configured to transform the data by:
   performing a first data transformation on the data; and
   performing a second data transformation, different from the first data transformation, on the data.

18. The HSSD of claim 11,
   wherein the first NVM comprises a NAND Flash, and
   wherein the second NVM comprises at least one of magnetoresistive random-access memory, non-volatile RAM, ferroelectric RAM, phase-change RAM, or resistive random-access memory (ReRAM).

19. The HSSD of claim 18, wherein the first NVM is page-addressable, and the second NVM is byte-addressable.

20. The HSSD of claim 11, wherein the processing circuit is further configured to, at least one of:
   store the transformed data in the first NVM;
   store the transformed data in the second NVM; or
   send the transformed data to the host.

21. A hybrid solid state drive (HSSD) comprising: a first non-volatile memory (NVM); a second NVM that is configured to provide a finer granularity of random data access than that of the first NVM, wherein a smallest addressable unit of the second NVM is smaller than a smallest addressable unit of the first NVM; means for receiving data from a host and storing the data at the first NVM; means for receiving a transformation command from the host; means for storing a copy of the data at the second NVM; and means for transforming, based on the transformation command, the data stored at the second NVM, using the first NVM to store initial data and the second NVM for data processing, to generate transformed data stored in at least one of the first NVM or the second NVM.

22. The HSSD of claim 21, wherein the means for transforming comprises at least one of a processor, a field-programmable gate array (FPGA), or an application-specific integrated circuit (ASIC).

23. The HSSD of claim 21, wherein the means for transforming is configured to:
   utilize a MapReduce model to process the data stored at the second NVM; and
   store temporary values generated by the MapReduce model at the second NVM.

24. The HSSD of claim 21, wherein the means for transforming is configured to:
   process the data stored at the second NVM to generate intermediate data according to the transformation command; and
   store the intermediate data at the second NVM.

25. The HSSD of claim 21, further comprising:
   means for receiving metadata of the data from the host, wherein the metadata comprises information on the data stored at the first NVM.

26. The HSSD of claim 21, wherein the means for transforming is further configured to:
   process a first data type of the data using a first data processing method; and
   process a second data type of the data using a second data processing method simultaneously with the processing of the first data type.

27. The HSSD of claim 21, wherein the means for transforming is further configured to:
   perform a first data transformation on the data; and
   perform a second data transformation, different from the first data transformation, on the data.

28. The HSSD of claim 21,
   wherein the first NVM comprises a NAND Flash, and
   wherein the second NVM comprises at least one of magnetoresistive random-access memory, non-volatile RAM, ferroelectric RAM, phase-change RAM, or resistive random-access memory (ReRAM).

29. The HSSD of claim 28, wherein the first NVM is page-addressable, and the second NVM is byte-addressable.

30. The HSSD of claim 21, further comprising means for, at least one of:
   storing the transformed data in the first NVM;
   storing the transformed data in the second NVM; or
   sending the transformed data to the host.

31. The method of claim 1, further comprising:
   registering associations between a plurality of data types and a plurality of data processing methods according to the transformation command, wherein the plurality of data processing methods are respectively implemented at a plurality of programmable functional blocks of the processing circuit;
   determining a first data type of the plurality of data types corresponding to the data stored at the second NVM;
   selecting a first data processing method of the plurality of data processing methods, associated with the first data type; and
   transforming the data stored at the second NVM using the first data processing method implemented at the corresponding programmable functional block.

32. The HSSD of claim 11, wherein the processing circuit is further configured to:
- register associations between a plurality of data types and a plurality of data processing methods according to the transformation command, wherein the plurality of data processing methods are respectively implemented at a plurality of programmable functional blocks of the processing circuit;
- determine a first data type of the plurality of data types corresponding to the data stored at the second NVM;
- select a first data processing method of the plurality of data processing methods, associated with the first data type; and
- transform the data stored at the second NVM using the first data processing method implemented at the corresponding programmable functional block.

* * * * *